No. 647,346. Patented Apr. 10, 1900.
Z. W. WELCH & E. H. BLACKSHEAR.
NUT LOCK.
(Application filed Feb. 10, 1900.)
(No Model.)
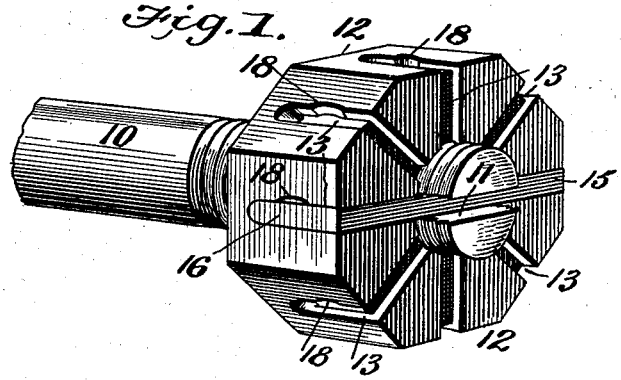
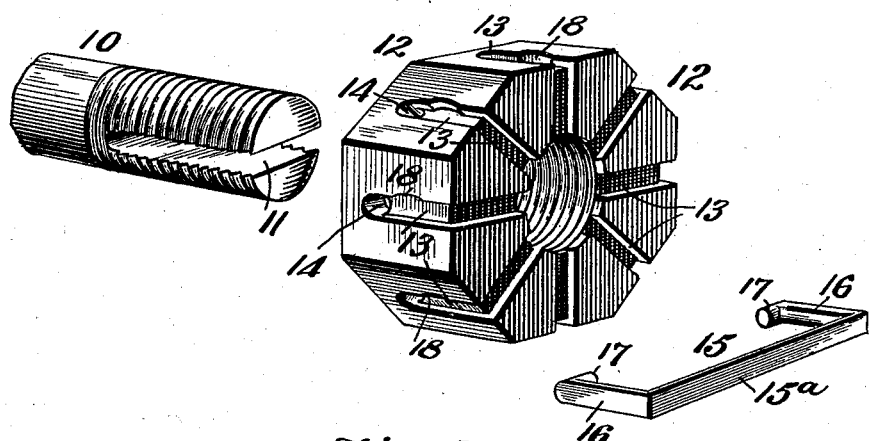
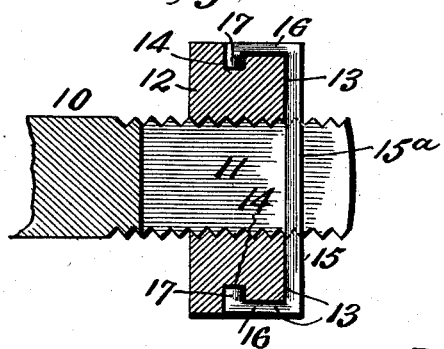
WITNESSES:
M. D. Blondel
F. S. Stitt
INVENTORS
Z. W. Welch
E. H. Blackshear
BY Munn & Co.
ATTORNEYS

UNITED STATES PATENT OFFICE.

ZACHAREAH WASHINGTON WELCH AND EUGENE HURBERT BLACKSHEAR, OF McCOMB, MISSISSIPPI.

NUT-LOCK.

SPECIFICATION forming part of Letters Patent No. 647,346, dated April 10, 1900.

Application filed February 10, 1900. Serial No. 4,768. (No model.)

*To all whom it may concern:*

Be it known that we, ZACHAREAH WASHINGTON WELCH and EUGENE HURBERT BLACKSHEAR, of McComb, in the county of Pike and State of Mississippi, have invented a new and useful Improvement in Nut-Locks, of which the following is a specification.

Our invention is an improvement in nut-locks; and it has for its object a device of this character embodying certain details of construction which will render it very strong, capable of close adjustment, and of sightly appearance.

With this end in view the invention consists in the details of construction hereinafter specifically described and claimed.

Reference is to be had to the accompanying drawings, forming part of this specification, in which like characters of reference indicate corresponding parts in all the views.

Figure 1 is a perspective view of the end of a bolt having our improved nut locked thereon. Fig. 2 is a perspective view of the parts shown detached, and Fig. 3 is a longitudinal section thereof.

The bolt 10 is threaded, as usual, at one end, and is formed in its threaded end with a diametrical longitudinally-extending recess 11.

Our improved nut 12 is provided with the usual thread-opening whereby it is inserted on the bolt and is formed, as shown, with a plurality of diametrical grooves 13, preferably eight in number, and extending from the central threaded opening over the outer face of the nut and on the sides of the same to a point about midway between the two faces, where they terminate in depressions 14. After the nut has been screwed home a spring-yoke 15 is employed to lock the same, said yoke consisting of a cross-bar 15ª, which is adapted to enter the recess 11 and diametrically-opposite face-grooves in the nut, as shown in Fig. 1, and inwardly-springing side bars 16, adapted to fit in the grooves in the sides of the nut, and having inwardly-extending terminal lugs 17, adapted to enter the depressions 14. A recess 18 is formed in one wall of each groove for the insertion of a suitable tool to remove the spring-yoke. It is to be especially observed that the size of the grooves, their end depressions, the recess in the end of the bolt, and the spring-yoke are so proportioned that when the latter is in place it is exactly flush with the outer face and sides of the nut, thereby presenting a very sightly appearance, economizing space, and leaving no projecting parts by which it may be accidentally removed, while its arrangement on the outside of the nut permits of its ready application and removal. It should also be observed that the number of grooves renders the nut easy of adjustment, though in no wise detracting from its effective locking properties.

Having thus described our invention, what we claim as new, and desire to secure by Letters Patent, is—

1. The combination with the bolt having an end recess, of a nut formed with a plurality of diametrically-opposite grooves extending from its central opening over one face and in its sides, and a spring-yoke having a cross-bar and side bars fitting accurately the recess and registering face-grooves, and side grooves, respectively, as set forth.

2. The combination with a bolt having a diametrical longitudinal recess in its threaded end, of a nut formed with a plurality of diametrically-opposite face-grooves and side grooves continuing from the face-grooves and terminating in depressions, and a spring-yoke consisting of a cross-bar fitted in said recess and lying in the face-grooves flush with the face of the nut, and side bars lying in the side grooves flush with the sides of the nut and having inwardly-extending terminal lugs fitting in said depressions, there being provided a recess in one wall of each side groove, as set forth.

ZACHAREAH WASHINGTON WELCH.
EUGENE HURBERT BLACKSHEAR.

Witnesses:
JAS. M. FLY, Jr.,
H. N. CRAWFORD.